United States Patent
Weik et al.

(10) Patent No.: US 10,825,439 B2
(45) Date of Patent: Nov. 3, 2020

(54) SOUND-ABSORBING TEXTILE COMPOSITE

(71) Applicant: Carl Freudenberg KG, Weinheim (DE)

(72) Inventors: Angela Weik, Bruehl (DE); Sandra Villing-Falusi, Heddesheim (DE); Peter Rutsch, Abtsteinach (DE)

(73) Assignee: CARL FREUDENBERG KG, Weinheim (DE)

( * ) Notice: Subject to any disclaimer, the term of this patent is extended or adjusted under 35 U.S.C. 154(b) by 353 days.

(21) Appl. No.: 15/803,890

(22) Filed: Nov. 6, 2017

(65) Prior Publication Data
US 2018/0268800 A1 Sep. 20, 2018

(30) Foreign Application Priority Data

Mar. 17, 2017 (DE) ........................ 10 2017 002 552
Jul. 4, 2017 (EP) ..................................... 17179635
Jul. 5, 2017 (EP) ..................................... 17179777

(51) Int. Cl.
*G10K 11/168* (2006.01)
*B32B 5/26* (2006.01)
(Continued)

(52) U.S. Cl.
CPC ............ *G10K 11/168* (2013.01); *B32B 5/022* (2013.01); *B32B 5/08* (2013.01); *B32B 5/26* (2013.01); *B32B 5/28* (2013.01); *B32B 7/12* (2013.01); *B32B 27/08* (2013.01); *B32B 27/32* (2013.01); *B32B 27/36* (2013.01); *B60R 13/08* (2013.01);
(Continued)

(58) Field of Classification Search
CPC ..... B60R 13/08; B60R 13/0815; B32B 5/022; B32B 5/08; B32B 5/26; B32B 5/28; B32B 7/12; B32B 27/08; B32B 27/32; B32B 27/36; B32B 2266/102; B32B 2307/718;
(Continued)

(56) References Cited

U.S. PATENT DOCUMENTS

| 4,283,457 A | 8/1981 | Kolsky et al. |
| 5,298,694 A | 3/1994 | Thompson et al. |

(Continued)

FOREIGN PATENT DOCUMENTS

| CH | 693409 A5 | 7/2003 |
| DE | 19821532 A1 | 11/1999 |

(Continued)

OTHER PUBLICATIONS

English translation of JP 2015121631 A, accessed Jan. 16, 2020 from EPO website <http://translationportal.epo.org/emtp/translate/?ACTION=description-retrieval&COUNTRY=JP&ENGINE=google&FORMAT=docdb&KIND=A&LOCALE=en_EP&NUMBER=2015121631&OPS=ops.epo.org/3.2&SRCLANG=ja&TRGLANG=en>.*

*Primary Examiner* — Jeremy A Luks
(74) *Attorney, Agent, or Firm* — Leydig, Voit & Mayer, Ltd.

(57) ABSTRACT

In an embodiment, the present invention provides a sound-absorbing textile composite, including: a) at least one open-pore support layer comprising coarse staple fibers having a titer of from 3 dtex to 17 dtex and fine staple fibers having a titer of from 0.3 dtex to 2.9 dtex, as scaffold fibers; and b) a microporous flow layer arranged on the support layer and including microfibers having a fiber diameter of less than 10 µm. A flow resistance of the sound-absorbing textile composite is from 250 Ns/m³ to 5000 Ns/m³.

19 Claims, 4 Drawing Sheets

(51) Int. Cl.
*B60R 13/08* (2006.01)
*B32B 5/28* (2006.01)
*B32B 5/02* (2006.01)
*B32B 5/08* (2006.01)
*B32B 7/12* (2006.01)
*B32B 27/08* (2006.01)
*B32B 27/32* (2006.01)
*B32B 27/36* (2006.01)
*D04H 1/4382* (2012.01)
*D04H 1/4374* (2012.01)
*D04H 1/56* (2006.01)
*D04H 1/559* (2012.01)

(52) U.S. Cl.
CPC ........... *B32B 2262/0253* (2013.01); *B32B 2262/0284* (2013.01); *B32B 2307/102* (2013.01); *B32B 2307/718* (2013.01); *B32B 2307/732* (2013.01); *B60R 13/0815* (2013.01); *B60Y 2304/03* (2013.01); *B60Y 2306/09* (2013.01); *D04H 1/4374* (2013.01); *D04H 1/4382* (2013.01); *D04H 1/559* (2013.01); *D04H 1/56* (2013.01)

(58) Field of Classification Search
CPC ........... G10K 11/168; B60Y 2304/03; B60Y 2306/09; D04H 1/4382; D04H 1/4374
See application file for complete search history.

(56) References Cited

U.S. PATENT DOCUMENTS

| | | | |
|---|---|---|---|
| 6,160,028 A * | 12/2000 | Dyer | C08F 291/00 521/63 |
| 6,231,940 B1 * | 5/2001 | Aichner | B32B 9/00 428/332 |
| 6,720,068 B1 | 4/2004 | Ray et al. | |
| 6,749,929 B1 | 6/2004 | Enkler et al. | |
| 2005/0026527 A1 | 2/2005 | Schmidt et al. | |
| 2006/0013996 A1 * | 1/2006 | Koyama | B32B 3/30 428/138 |
| 2006/0021823 A1 | 2/2006 | Kohara et al. | |
| 2006/0113146 A1 * | 6/2006 | Khan | B32B 5/18 181/286 |
| 2006/0128246 A1 | 6/2006 | Anderegg | |
| 2008/0003907 A1 * | 1/2008 | Black | D04H 1/559 442/327 |
| 2015/0204066 A1 * | 7/2015 | Kim | E04B 1/84 181/294 |

FOREIGN PATENT DOCUMENTS

| | | |
|---|---|---|
| DE | 10163576 B4 | 7/2006 |
| EP | 1058618 B1 | 2/2004 |
| EP | 2275253 A1 | 1/2011 |
| GB | 1250479 A | 10/1971 |
| GB | 2407296 A | 4/2005 |
| JP | 08311759 A | 11/1996 |
| JP | 2001205725 A | 7/2001 |
| JP | 2002161464 A | 6/2002 |
| JP | 2004021246 A | 1/2004 |
| JP | 2007279649 A | 10/2007 |
| JP | 2009184296 A | 8/2009 |
| JP | 2012136803 A | 7/2012 |
| JP | 2015121631 A | 7/2015 |
| JP | 2016045450 A | 4/2016 |
| KR | 20050123137 A | 12/2005 |

* cited by examiner

SOUND-ABSORBING TEXTILE COMPOSITE

CROSS-REFERENCE TO PRIOR APPLICATION

Priority is claimed to German Patent Application No. DE 10 2017 002 552.5, filed on Mar. 17, 2017, European Patent Application No. EP 17 179 635.2, filed on Jul. 4, 2017, and European Patent Application No. EP 17 179 777.2, filed Jul. 5, 2017, the entire disclosures of which are hereby incorporated by reference herein.

FIELD

The invention relates to a sound-absorbing textile composite. The invention further relates to a method for the production thereof and to the use thereof for sound absorption in the automotive field.

BACKGROUND

U.S. Pat. No. 5,298,694 A describes a method for sound absorption in which an acoustically insulating nonwoven is used which comprises a proportion of microfibers (meltblown microfibers) mixed with a proportion of crimped bulking fibers. The microfibers have an average fiber diameter of less than 15 μm, preferably from 5 to 10 μm, and are distributed in the crimped staple fiber nonwoven in a ratio by weight of from 40:60 to 95:5. The acoustic effectiveness is obtained in this material structure by achieving a higher inner surface area in the nonwoven through the increased use of microfibers, so that the kinetic energy of the sound waves can increasingly be converted into heat energy. A disadvantage of the described nonwoven is that the air-flow resistance in the individual layers cannot be controlled or specified, and therefore the sound-absorbing properties of the acoustically insulating nonwoven are not optimal.

Insulating materials for absorbing sound waves and for thermal insulation are also known from DE 10163576 B4, which materials consist of two different thermoplastic matrix fibers (in the region of 0.8 and 1.7 dtex) as well as a proportion of thermoplastic fusible fibers (2.2 dtex). An average fiber diameter of 1.3 dtex is thereby achieved in the nonwoven as a whole. It is clear that the reduced use of binding fibers (10% of the fiber mixture) results in a nonwoven which has good draping properties and additionally has an inner strength of the nonwoven which is achieved by means of both mechanical and thermal bonding. However, for process-related reasons, it is not possible to purposively adjust the acoustics of the insulating material. In addition, the absorption of the sound waves cannot be improved further by the use of finer staple fibers because, according to the current prior art, finer fibers below 0.5 dtex cannot reliably be carried on carding machines.

EP 1058618 B1 describes a sound-absorbing thin-layer laminate which consists of an open-pore support layer and a second open-pore fiber layer. The open-pore support layer can be either a nonwoven having a weight per unit area of less than 2000 g/m² and a thickness of less than 50 mm or an ultra-light plastics foam having a density of from 16 to 32 kg/m³ and a thickness of at least 6 mm. The second open-pore fiber layer is produced from meltblown microfibers which have a fiber diameter of preferably from 2 to 5 μm. In addition, air-flow resistance of from 500 to 4000 Ns/m³ is described. As a result of the laminate-like structure of the sound-absorbing thin-layer laminate, a flow layer which can be acoustically adjusted is provided. A disadvantage of this composite is the fact that the support layer does not exhibit explicit acoustic relevance.

SUMMARY

In an embodiment, the present invention provides a sound-absorbing textile composite, comprising: a) at least one open-pore support layer comprising coarse staple fibers having a titer of from 3 dtex to 17 dtex and fine staple fibers having a titer of from 0.3 dtex to 2.9 dtex, as scaffold fibers; and b) a microporous flow layer arranged on the support layer and comprising microfibers having a fiber diameter of less than 10 μm, wherein a flow resistance of the sound-absorbing textile composite is from 250 Ns/m³ to 5000 Ns/m³.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
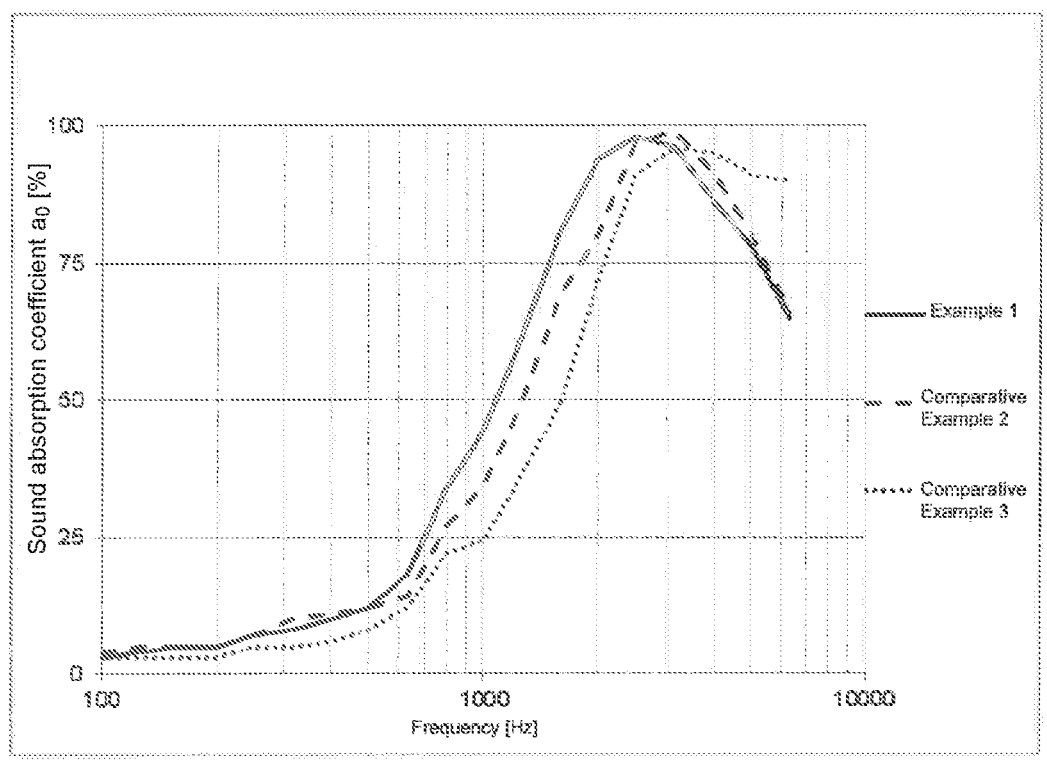
FIG. 1: Comparison of the sound absorption coefficient in the impedance tube (DIN EN ISO 10534) of Example 1 according to the invention with Comparative Examples 2 and 3.

In addition, the sound-absorbing material is intended to exhibit very good acoustic absorption properties in the frequency range of from 800 Hz to 2000 Hz that is significant for the automotive industry.

This problem is solved by a sound-absorbing textile composite, in particular a nonwoven composite, comprising a) at least one open-pore support layer comprising coarse staple fibers having a titer of from 3 dtex to 17 dtex and fine staple fibers having a titer of from 0.3 dtex to 2.9 dtex, preferably from 0.4 dtex to 2.9 dtex, in particular from 0.5 dtex to 2.9 dtex, as scaffold fibers, and b) a microporous flow layer arranged on the support layer and comprising microfibers having a fiber diameter of less than 10 μm, wherein the flow resistance of the sound-absorbing textile composite is from 250 Ns/m³ to 5000 Ns/m³, preferably from 250 Ns/m³ to 4000 Ns/m³, more preferably from 250 Ns/m³ to 3000 Ns/m³, in particular from 250 Ns/m³ to 2000 Ns/m³.

Surprisingly, it has been found that the above-described disadvantages of the prior art can be avoided using the textile composite according to the invention. It has further been found that a textile composite of the above structure exhibits outstanding acoustic absorption properties in the frequency range of from 800 Hz to 2000 Hz that is significant for the automotive industry.

Without committing to a mechanism according to the invention, it is supposed that the surprisingly high sound absorption coefficient that has been found is attributable to a synergistic interaction between the fine fibers and the coarse fibers of the support layer in combination with the flow layer. Thus it is supposed that the particular selection of fine staple fibers having a titer of from 0.3 dtex to 2.9 dtex, in particular from 0.5 dtex to 2.9 dtex, and coarse staple fibers having a titer of from 3 dtex to 17 dtex in the support layer permits the formation of a scaffold structure which is particularly suitable for sound absorption and which is itself capable of absorbing sound waves. This is because the suitable selection of fine and coarse staple fibers makes it possible to provide the support layer with high compressibility and high resilience, so that the flow layer can optimally be made to oscillate on the support layer and sound energy can thus be absorbed particularly efficiently, according to the principle of a "flexible panel absorber".

In addition, the combination of an open-pore support layer and a microporous flow layer permits simple and purposive adjustment and variability of the acoustic properties of the textile composite. Furthermore, it has been found that the textile composite according to the invention can be manufactured so as to have high compressibility and good resilience while at the same time having low weights per unit area. Thus, in a preferred embodiment of the invention, the textile composite has a compressibility of from 70% to 100%, preferably from 75% to 100% and in particular from 80% to 100%, and/or a resilience of from 70% to 100%, preferably from 75% to 100% and in particular from 80% to 100%. As a result, the textile composite can easily be compressed and thus at the same time very easily be placed in the specified installation spaces since it is able to bounce back very well in the installation space because of its good resilience. This allows the composite to be installed even in installation spaces having difficult geometries and different thickness dimensions.

The support layer can in principle be a woven fabric, a knitted fabric and/or a nonwoven. According to the invention, the support layer is preferably a nonwoven according to DIN EN ISO 9092, resulting in a nonwoven composite.

The fiber titer of the coarse staple fibers of the support layer is from 3 dtex to 17 dtex. In a preferred embodiment, the fiber titer is from 3 dtex to 12 dtex and in particular from 3 dtex to 9 dtex. The coarse staple fibers give the textile composite the necessary structure and thus ensure that the textile composite remains dimensionally stable even in the fitted state.

If the support layer does not contain binding fibers, in a preferred embodiment of the invention the support layer contains the coarse staple fibers in a proportion of from 10 wt. % to 90 wt. %, preferably from 20 wt. % to 90 wt. %, more preferably from 30 wt. % to 90 wt. %, more preferably from 50 wt. % to 90 wt. %, more preferably from 60 wt. % to 90 wt. % and in particular from 70 wt. % to 90 wt. %, in each case based on the total weight of the support layer. If the support layer contains binding fibers as further fibers, the proportion of coarse staple fibers is preferably from 5 wt. % to 85 wt. %, more preferably from 10 wt. % to 85 wt. %, more preferably from 20 wt. % to 80 wt. %, more preferably from 30 wt. % to 80 wt. %, more preferably from 40 wt. % to 80 wt. %, more preferably from 50 wt. % to 80 wt. % and in particular from 60 wt. % to 80 wt. %, in each case based on the total weight of the support layer.

The fiber titer of the fine staple fibers of the support layer of the textile composite according to the invention is from 0.3 dtex to 2.9 dtex, in particular from 0.5 dtex to 2.9 dtex. It is also conceivable for the fiber titer of the fine staple fibers to be between 0.3 dtex and 0.5 dtex, for example from 0.3 dtex to 0.49 dtex. In a preferred embodiment, the fiber titer of the fine staple fibers is from 0.5 dtex to 2.5 dtex and in particular from 0.5 dtex to 2.0 dtex. By using fine staple fibers in the support layer, sound energy can be converted into heat energy in this layer too on account of the now larger inner surface area of the support layer.

If the support layer does not contain binding fibers, in a preferred embodiment of the invention the support layer contains the fine staple fibers in a proportion of from 10 wt. % to 90 wt. %, preferably from 10 wt. % to 80 wt. %, more preferably from 10 wt. % to 70 wt. %, more preferably from 10 wt. % to 60 wt. %, more preferably from 10 wt. % to 50 wt. %, more preferably from 10 wt. % to 40 wt. % and in particular from 10 wt. % to 30 wt. %, in each case based on the total weight of the support layer. If the support layer contains binding fibers as further fibers, the proportion of fine staple fibers is preferably from 10 wt. % to 90 wt. %, more preferably from 10 wt. % to 80 wt. %, more preferably from 10 wt. % to 70 wt. %, more preferably from 10 wt. % to 60 wt. %, more preferably from 10 wt. % to 50 wt. %, more preferably from 10 wt. % to 40 wt. % and in particular from 10 wt. % to 30 wt. %, in each case based on the total weight of the support layer.

According to the invention, the scaffold fibers are staple fibers. Unlike the binding fibers which may be contained in the support layer, the scaffold fibers are not or only negligibly fused. Unlike filaments, which theoretically have an unlimited length, staple fibers have a defined fiber length. According to the invention, the fine and coarse staple fibers used as scaffold fibers preferably have, independently of one another, a staple length of from 20 mm to 80 mm, preferably from 25 mm to 80 mm, in particular from 30 mm to 80 mm. Natural fibers, synthetic fibers or mixtures thereof may be used as scaffold fibers. Synthetic fibers are preferably used.

In a preferred embodiment of the invention, the fine and coarse staple fibers used as scaffold fibers comprise, independently of one another, at least one polymer selected from the group consisting of: polyacrylonitrile, polyvinyl alcohol, viscose, polyamides, in particular polyamide 6 and polyamide 6.6, preferably polyolefins and most particularly preferably polyesters, in particular polyethylene terephthalate, polyethylene naphthalate and polybutylene terephthalate, mixtures and/or copolymers thereof. The scaffold fibers preferably contain the at least one polymer in a proportion of at least 90 wt. %, preferably at least 95 wt. %, in particular more than 97 wt. %.

In a particularly preferred embodiment of the invention, the scaffold fibers contain at least one polymer selected from the group consisting of: polyesters, in particular polyethylene terephthalate, polyamide and mixtures or copolymers thereof. In a particularly preferred embodiment of the invention, the scaffold fibers are polyester fibers, in particular of polyethylene terephthalate. The advantage of such fibers is the self-extinguishing burning behavior of polyethylene terephthalate, which again is relevant for the use of the textile composite in the automotive field.

In addition to the fine staple fibers and the coarse staple fibers, the support layer can also contain further fibers. According to the invention, the support layer preferably comprises at least partially fused binding fibers as further fibers. The fibers which are conventionally used for this purpose can be used as the binding fibers, provided that they can be at least partially thermally fused. Binding fibers can be single fibers or also multicomponent fibers. Particularly suitable binding fibers according to the invention are fibers in which the binding component has a melting point which is below the melting point of the scaffold fibers that are to be bound, preferably below 250° C., more preferably from 70 to 235° C., more preferably from 125 to 225° C., particularly preferably from 150 to 225° C. Suitable binding fibers are in particular fibers which contain thermoplastic polyesters and/or copolyesters, in particular polybutylene terephthalate, polyolefins, in particular polypropylene, polyamides, polyvinyl alcohol, as well as copolymers and mixtures thereof, and/or which consist of those polymers.

Particularly suitable binding fibers according to the invention are multicomponent fibers, preferably bicomponent fibers, in particular core/sheath fibers. Core/sheath fibers contain at least two fiber polymers having different softening and/or melting temperatures. The core/sheath fibers preferably consist of these two fiber polymers. The component that has the lower softening and/or melting temperature is to be found on the fiber surface (sheath) and the component that has the higher softening and/or melting temperature is to be found in the core.

In core/sheath fibers, the binding function can be performed by the materials that are arranged on the surface of the fibers. A wide range of materials can be used for the sheath. According to the invention, preferred materials for the sheath are polybutylene terephthalate, polyamide, polyethylene, copolyamides and/or also copolyesters. A wide range of materials can likewise be used for the core. According to the invention, preferred materials for the core are polyesters, in particular polyethylene terephthalate and/or polyethylene naphthalate, and/or polyolefins.

The use of core/sheath binding fibers is preferred according to the invention because a particularly homogeneous distribution of the binder component in the nonwoven can thus be achieved.

If the support layer contains binding fibers as further fibers, the support layer preferably contains those fibers in a proportion of from 5 wt. % to 50 wt. %, preferably from 10 wt. % to 50 wt. %, more preferably from 10 wt. % to 40 wt. %, in particular from 10 wt. % to 30 wt. %, in each case based on the total weight of the support layer.

According to the invention, the support layer is preferably bound and bonded by the at least partially fused binding fibers. The partially fused binding fibers are preferably fused without a mechanical load, for example using a continuous furnace. This has the advantage that the nonwoven can be produced so as to have a high volume and does not lose volume due to mechanical action. In a further preferred embodiment of the invention, the air-to-fiber volume ratio in the support layer is from 75:1 to 250:1, preferably from 100:1 to 225:1, in particular from 125:1 to 200:1.

In a further embodiment of the invention, the support layer is bound by means of a binder, preferably in addition to being bonded by the binding fibers. Polyacrylates, polystyrenes, polyvinyl acetate-ethylene, polyurethanes and mixtures and copolymers thereof can be used as binders.

According to the invention, the support layer is preferably so lightly bonded that the sound-absorbing textile composite can easily be draped and compressed and can thus be used in a wide range of installation spaces.

The flow layer can in principle be a woven fabric, a knitted fabric and/or a nonwoven. According to the invention, the support layer is preferably a nonwoven according to DIN EN ISO 9092, resulting in a nonwoven composite.

According to the invention, a microporous flow layer is to be understood as being a microporous layer which has a specific flow resistance, in particular of more than 250 Ns/m$^3$, for example from 250 Ns/m$^3$ to 5000 Ns/m$^3$, preferably from 250 Ns/m$^3$ to 4000 Ns/m$^3$, more preferably from 250 Ns/m$^3$ to 3000 Ns/m$^3$, in particular from 250 Ns/m$^3$ to 2000 Ns/m$^3$. The advantage of providing the support layer with the flow layer is that the sound absorption properties of the support layer can be improved. The weight per unit area of the support layer can thereby be kept low and a product having outstanding acoustic properties can nevertheless be obtained.

The adjustment of the flow resistance of the flow layer can be obtained in a manner known to a person skilled in the art by purposive adjustment of the porosity or density. With too porous a material, insufficient friction would form at the fibers and thus it would not be possible to convert sufficient kinetic energy into heat energy, as a result of which absorption is scarcely possible. With too dense a material, on the other hand, the sound waves would mainly be reflected at the material surface and thus could not be absorbed in the material.

According to the invention, the flow layer contains microfibers having a titer of less than 10 µm, preferably from 0.5 µm to 5 µm, more preferably from 1 µm to 3 µm. The advantage of using microfibers is that, owing to the small fiber diameter, a very large inner surface area is provided in the nonwoven, at which area the sound energy can be absorbed particularly well. Fibers having such fineness can be obtained in a simple manner, for example by the meltblown process (meltblown fibers), resulting in a meltblown nonwoven. The advantage of using meltblown fibers is that nonwovens having a high density and good acoustic properties can be obtained in a simple manner therewith.

Synthetic fibers are preferably used as microfibers for the flow layer. Said fibers preferably comprise at least one polymer selected from the group consisting of: polyolefins, in particular polypropylene, polyethylene terephthalate, polyamide, mixtures and/or copolymers thereof. The microfibers preferably contain the above-mentioned polymers, mixtures and/or copolymers thereof in a proportion of at least 90 wt. %, preferably more than 95 wt. %, in particular more than 97 wt. %.

The flow layer preferably contains the microfibers in a proportion of more than 50 wt. %, preferably more than 70 wt. %, in particular more than 90 wt. %, in each case based on the total weight of the flow layer.

The textile composite according to the invention can consist only of a support layer and a flow layer. However, according to the invention the textile composite preferably has further layers, in particular at least a cover layer arranged on the flow layer. This has the advantage that the flow layer can be better protected from damage. It has been found to be particularly suitable to use meltspun nonwovens as the cover layer. The weight per unit area of the cover layer is preferably less than 25 g/m$^2$, for example from 12 g/m$^2$ to 17 g/m$^2$. Likewise preferably, the cover layer consists of thermoplastic filaments, in particular polypropylene filaments.

The support layer, the flow layer and, where present, the cover layer can be joined to one another in various ways. For example, it is conceivable for the layers to be bonded to one another by means of adhesive materials. If a meltblown nonwoven is used as the flow layer, joining to the flow layer is effected, in a preferred embodiment of the invention, by spinning the meltblown fibers directly onto the support layer. It is thereby possible to obtain a nonwoven composite in which no definite phase boundary between the support layer and the flow layer is discernible. This allows a fiber fineness gradient to be established in the boundary region of the support layer and the flow layer, which has an advantageous effect on the acoustic properties. Furthermore, an additional adhesive layer can be omitted, which likewise has an advantageous effect on the acoustic properties.

According to the invention, the textile composite has a flow resistance of from 250 Ns/m$^3$ to 5000 Ns/m$^3$, preferably from 250 Ns/m$^3$ to 4000 Ns/m$^3$, more preferably from 250 Ns/m$^3$ to 3000 Ns/m$^3$, in particular from 250 Ns/m$^3$ to 2000 Ns/m$^3$, and/or from 350 Ns/m$^3$ to 5000 Ns/m$^3$, preferably from 450 Ns/m$^3$ to 5000 Ns/m$^3$, more preferably from 550 Ns/m$^3$ to 5000 Ns/m$^3$, and/or from 350 Ns/m$^3$ to 2000 Ns/m$^3$, preferably from 450 Ns/m$^3$ to 2000 Ns/m$^3$ and in particular from 550 Ns/m$^3$ to 2000 Ns/m$^3$. It is also conceivable for the textile composite to have a flow resistance between 2000 Ns/m$^3$ and 5000 Ns/m$^3$, for example from 2001 Ns/m$^3$ to 5000 Ns/m$^3$. The flow resistance of the textile composite is composed of the flow resistances of the support layer and the flow layer. The flow layer thereby generally contributes a significantly higher proportion to the flow resistance. The flow resistance can therefore be adjusted in a simple manner by selecting a suitable flow layer having the desired flow resistance.

Outstanding sound absorption coefficients can be achieved using the textile composite according to the invention, for example from 30% to 100%, preferably from 40% to 100%, more preferably from 50% to 100%, in each case at 1000 Hz, measured in accordance with DIN ES ISO 10534-1. These high sound absorption coefficients were surprising to a person skilled in the art because they are higher than the sum of the sound absorption coefficients of the flow layer and the support layer when they are measured individually.

The weight per unit area of the textile composite is preferably from 50 g/m$^2$ to 350 g/m$^2$, more preferably from 100 g/m$^2$ to 300 g/m$^2$ and in particular from 150 g/m$^2$ to 250 g/m$^2$. The advantage of these weights per unit area is that a lightweight textile composite can be provided, meaning that the vehicle emissions can in turn be lowered owing to the weight saving.

The thickness of the textile composite is preferably from 5 mm to 35 mm, more preferably from 10 mm to 30 mm and in particular from 15 mm to 25 mm. The advantage of thicknesses of at least 10 mm is that a high wall spacing is produced, so that the medium-length acoustic sound waves of the middle frequencies and the long sound waves of the low frequencies can also be absorbed within the textile composite.

The invention further provides a method for producing the textile composite according to the invention having a flow resistance of from 250 Ns/m$^3$ to 5000 Ns/m$^3$, in particular from 250 Ns/m$^3$ to 2000 Ns/m$^3$, comprising the following steps:

a) providing and/or producing at least one open-pore support layer comprising coarse staple fibers having a titer of from 3 dtex to 17 dtex and fine staple fibers having a titer of from 0.3 dtex to 2.9 dtex, in particular from 0.5 dtex to 2.9 dtex, as scaffold fibers;

b) providing and/or producing a microporous flow layer comprising microfibers having a fiber diameter of less than 10 µm;

c) arranging the flow layer on the support layer;

d) connecting the support layer and the flow layer.

If a meltblown nonwoven is used as the flow layer, joining with the flow layer can also take place by spinning the meltblown fibers directly onto the support layer. Consequently, the invention further provides a method for producing the nonwoven composite according to the invention having a flow resistance of from 250 Ns/m$^3$ to 5000 Ns/m$^3$, in particular from 250 Ns/m$^3$ to 2000 Ns/m$^3$, comprising the following steps:

a') providing and/or producing at least one open-pore support layer comprising coarse staple fibers having a titer of from 3 dtex to 17 dtex and fine staple fibers having a titer of from 0.3 dtex to 2.9 dtex, in particular from 0.5 dtex to 2.9 dtex, as scaffold fibers;

b') spinning a meltblown nonwoven as the microporous flow layer comprising microfibers having a fiber diameter of less than 10 µm onto the support layer.

The provision and/or production of at least one open-pore support layer can take place by production processes known to a person skilled in the art, for example by production processes for dry-laid staple fiber nonwovens. Processes which are suitable according to the invention for producing the support layer are, for example, carding processes as well as aerodynamic processes, such as the airlay and airlaid process. In the conventional carding process, the staple fibers are generally stripped down by means of worker-strippers to the level of individual fibers and deposited as a card web. This can subsequently be doubled, for example by means of a crosslapper, in order to form single-or multi-layer nonwovens. If a nonwoven having fibers in a tangled arrangement is to be produced, aerodynamic processes are particularly suitable. A tangled arrangement is advantageous because it is thereby possible to obtain voluminous, pressure-resilient nonwovens which at the same time have a low density. If binding fibers are used, these can be heated to melting point in a continuous furnace, for example, and thus serve to bond the nonwoven. Thermal bonding can take place before and/or after the support layer and the flow layer have been connected together. Further contactless types of bonding, such as applying a binder, are also possible. The nonwoven is particularly preferably bonded without mechanical bonding methods so as not to impair the voluminosity of the support layer.

The flow layer can likewise be produced in a manner known to a person skilled in the art. Meltblown processes are particularly preferred according to the invention. They have the advantage that fine fibers can be produced simply and inexpensively in one process step.

The support layer and the flow layer can be connected in a manner known to a person skilled in the art, for example by means of a hotmelt adhesive or pressure-sensitive adhesive. The hotmelt adhesive or pressure-sensitive adhesive is preferably applied to the support layer inline, and the flow layer is likewise supplied inline via unwinders.

If a meltblown nonwoven is used as the microporous flow layer, it is spun directly onto the support layer in a particularly preferred embodiment of the invention. It is thereby possible to obtain a nonwoven composite in which no definite phase boundary between the support layer and the flow layer is discernible. This allows a fiber fineness gradient to be established in the boundary region of the support layer and the flow layer, which in turn has an advantageous effect on the acoustic properties. Furthermore, an additional adhesive layer can be omitted, which again has an advantageous effect on the acoustic properties.

In order to protect the flow layer, it can optionally be provided with a cover layer, as described above. This is advantageous for meltblown nonwovens in particular.

The textile composite according to the invention is outstandingly suitable for sound absorption in the automotive field, for example as an acoustic component for vehicle interiors and in particular as a sound-absorbing insert in cladding parts of motor vehicles.

The invention is explained in greater detail below by means of a number of examples.

1. Textile Composite According to the Invention (Example 1)

A staple fiber nonwoven having a weight per unit area of 200 g/m² and a thickness of 21 mm is provided, which nonwoven consists of fine PET staple fibers of 1.7 dtex and a fiber length of 38 mm and coarse PET staple fibers having a fineness of 3.3 dtex and a fiber length of 64 mm and PET/Co-PET bicomponent fibers of 4.4 dtex and a fiber length of 51 mm. The staple fiber nonwoven is bound both thermally and by means of a binder. A polypropylene meltblown nonwoven having a weight per unit area of 50 g/m², a thickness of 0.5 mm and an average fiber diameter of 2 μm is applied to said staple fiber nonwoven by means of spray adhesive.

2. Comparative Examples 2 and 3

Comparative Example 2: Flow Layer with Unoptimized Support Layer

A staple fiber nonwoven having a weight per unit area of 350 g/m² and a thickness of 20 mm is provided, which nonwoven consists of coarse polyolefin bicomponent fibers having a fineness of 17 dtex and a fiber length of 38 mm. A polypropylene meltblown nonwoven having a weight per unit area of 50 g/m², a thickness of 0.5 mm and an average fiber diameter of 2 μm is applied to the staple fiber nonwoven by means of spray adhesive.

Comparative Example 3: 3M Thinsulate (TAI3027)

A staple fiber nonwoven having a weight per unit area of 330 g/m² and a thickness of 21 mm is provided, which nonwoven consists of 65 wt. % fine polypropylene meltblown fibers and 35 wt. % coarse PET staple fibers. In addition, a cover layer of 100 wt. % polypropylene is situated on one side of the staple fiber nonwoven.

3. Examples 4 and 5

Example 4

A staple fiber nonwoven having a weight per unit area of 200 g/m² and a thickness of 10 mm is provided, which nonwoven consists of 50 wt. % fine PET staple fibers of 0.6 dtex and 50 wt. % coarse PET staple fibers having a fineness of 4.4 dtex.

Example 5

A staple fiber nonwoven having a weight per unit area of 200 g/m² and a thickness of 10 mm is provided, which nonwoven consists of 80 wt. % fine PET staple fibers of 0.6 dtex and 20 wt. % coarse PET staple fibers having a fineness of 4.4 dtex.

4. Determination of the Flow Resistance of Example 1 and Comparative Example 2

In regard to Example 1 and Comparative Example 2, the flow resistances of the support layers and of the flow layers were measured independently of one another and in combination in accordance with DIN EN 29053.

| Test samples | Thickness in mm | Flow resistance in Ns/m³ |
|---|---|---|
| Support layer Example 1 | 21.0 | 67 |
| Support layer Comparative Example 2 | 20.0 | 10 |
| Flow layer Example 1 and Comparative Example 2 | 0.50 | 965 |
| Example 1 | 22.0 | 1047 |
| Comparative Example 2 | 21.0 | 1042 |

It is apparent that the flow resistances of the individual layers in combination with one another approximately add up. In addition, it is apparent that the total flow resistances of Example 1 and Comparative Example 2 differ by only 5 Ns/m³.

5. Determination of the Sound Absorption Coefficient

The sound absorption coefficients of Example 1 and Comparative Examples 2 and 3 were measured in accordance with DIN EN ISO 10534-1, Part 1. The results are shown in FIG. 1.

It is apparent that Example 1 exhibits outstanding acoustic absorption properties in the frequency range of from 800 Hz to 2000 Hz that is significant for the automotive industry. At 1000 Hz, a sound absorption coefficient of 45% was achieved, which is surprisingly high. In the case of Comparative Example 2, a value of only 35% was measured at 1000 Hz, and in the case of Comparative Example 3 an even lower value of only 25% was measured at 1000 Hz. Overall, in the frequency range of approximately from 800 Hz to 2500 Hz, a surprisingly higher sound absorption coefficient can be observed in the case of the nonwoven composite according to the invention, even though the weight per unit area of Example 1 is lower compared with Comparative Examples 2 and 3.

It is known that the absorptive capacity of a porous absorber is established via the flow resistance in combination with the wall spacing. The same wall spacing is chosen in all the examples, and therefore it cannot have any influence on the result. Considering Example 1 and Comparative Example 2, it is thus apparent that the total flow resistances of Example 1 and Comparative Example 2 are very similar (see section 3 above), and therefore this parameter cannot be responsible for the unexpected improvement in the sound absorption coefficient.

Without committing to a mechanism according to the invention, it is supposed that this surprisingly higher sound absorption coefficient is attributable to a synergistic interaction between the fine fibers and the coarse fibers of the support layer in combination with the flow layer. Thus it is supposed that the particular selection of fine staple fibers having a titer of from 0.3 dtex to 2.9 dtex, in particular from 0.5 dtex to 2.9 dtex, and coarse staple fibers having a titer of from 3 dtex to 17 dtex in the support layer permits the formation of a scaffold structure that is particularly suitable for sound absorption and is itself capable of absorbing sound waves. This is because the suitable selection of fine and coarse staple fibers makes it possible to provide the support layer with high compressibility and high resilience, so that the support layer is optimally excited to oscillation by the sound waves, and sound energy can thus be absorbed particularly efficiently.

The textile composite according to the invention in this case acts as a flexible panel absorber. Panel absorbers are highly efficient absorbers which can be adjusted exactly to the desired frequency ranges. The oscillating mass is provided by the mass of a film or of a thin panel. In the textile composite according to the invention, the oscillating mass is provided by means of the flow layer. In a panel absorber, the compliance of the resonance system is in most cases the compliance of the air cushion between the film or panel and the rear wall. In the textile composite according to the invention, the support layer functions as the compliance. Thus the following structure is preferably chosen for the textile composite according to the invention: flow layer—support layer—wall, wherein owing to the precisely defined very good compression and recovery properties of the support layer, the flow layer is able to optimally oscillate on the support layer, and thus internal losses additionally arise in the spring volume, that is to say within the support layer.

In summary, this means that, by means of the selection according to the invention of a specific support layer having high compressibility and high resilience, the mode of action of the flow layer as a porous absorber with additional damping in the support layer can be expanded and thus the sound absorption coefficient, in particular in the frequency range of from 800 Hz to 2000 Hz that is significant for automotive manufacturers, can be increased by means of the interplay of the modes of action of the porous absorber and of the flexible panel absorber. The surprising synergistic effect of the above-described acoustic modes of action is also demonstrated by a comparison of FIGS. 2 and 3.

Figure 2:
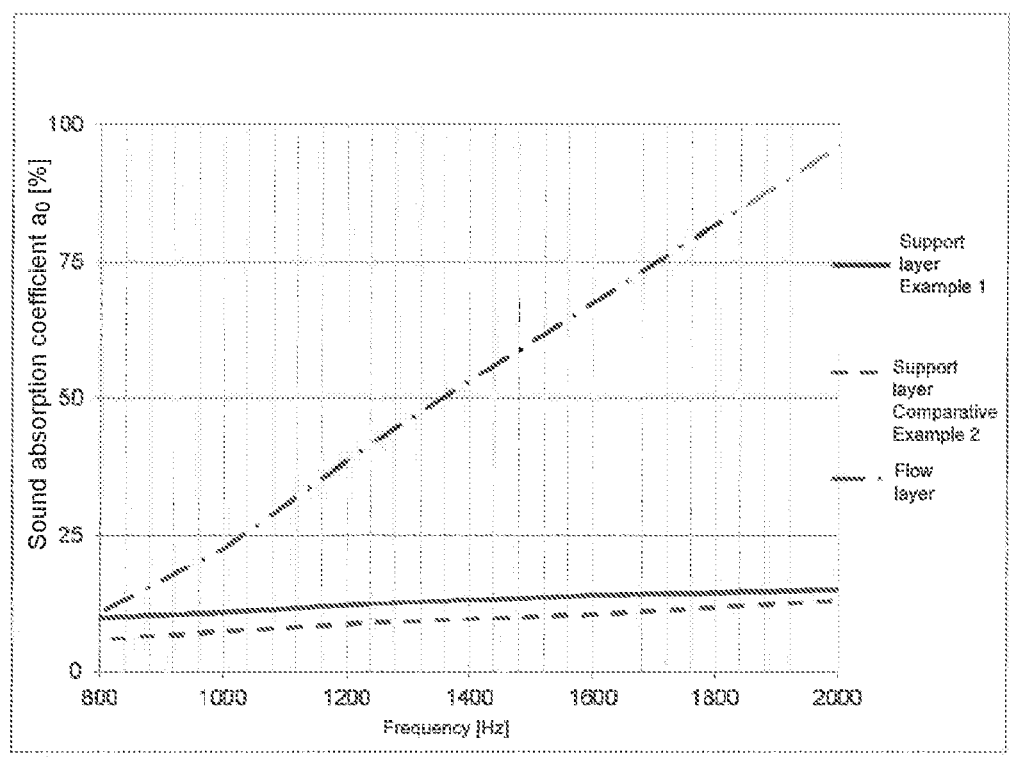
FIG. 2: Comparison of the sound absorption coefficient in the impedance tube (DIN EN ISO 10534) of the flow layer used in Example 1 according to the invention and Comparative Example 2 with the support layer used in Example 1 according to the invention and with the support layer used in Comparative Example 2.

In FIG. 2, only the individual layers used in the examples are initially considered. Specifically, the sound absorption coefficient in the impedance tube (DIN EN ISO 10534) of the flow layer used in Example 1 according to the invention and Comparative Example 2 is compared with the support layer used in Example 1 according to the invention and with the support layer used in Comparative Example 2. It is apparent that the support layers have approximately comparable sound absorption coefficients, whereas the flow layer has significantly higher sound absorption coefficients. Thus, at 1000 Hz, the support layer of Example 1 exhibits a sound absorption coefficient of approximately 11%, the support layer of Comparative Example 2 exhibits a sound absorption coefficient of approximately 8% and the flow layer exhibits a sound absorption coefficient of approximately 23%.

Figure 3:
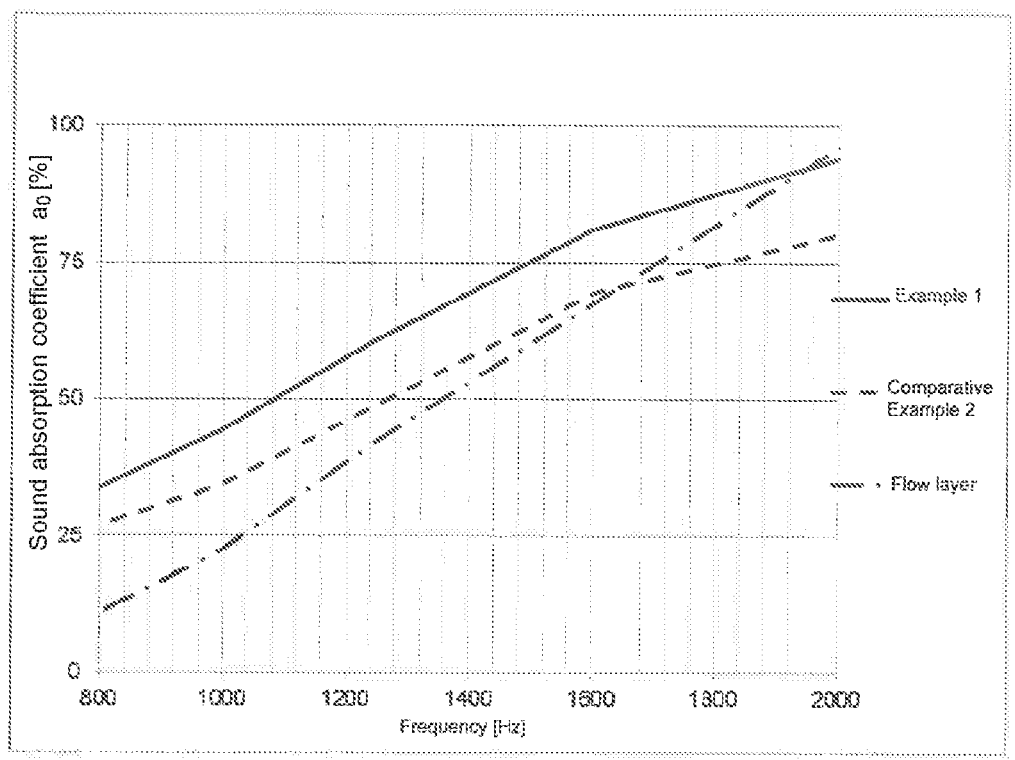
FIG. 3: Comparison of the sound absorption coefficient in the impedance tube (DIN EN ISO 10534) of Example 1 according to the invention, Comparative Example 2 and the isolated flow layer.

In FIG. 3, the sound absorption coefficient in the impedance tube (DIN EN ISO 10534) of the textile composite according to Example 1, of Comparative Example 2 and of the isolated flow layer are compared. It is apparent that Example 1 according to the invention has significantly higher sound absorption coefficients than both the isolated flow layer and Comparative Example 2. Thus, at 1000 Hz, Example 1 according to the invention exhibits a sound absorption coefficient of approximately 45%, Comparative Example 2 exhibits a sound absorption coefficient of approximately 35% and the flow layer exhibits a sound absorption coefficient of approximately 23%.

The value calculated for Example 1 according to the invention is surprisingly high. It was thus to be assumed that the sound absorption coefficients of the individual layers can approximately be added together. For Comparative Example 2 this would give: 8% [support layer]+23% [flow layer]=31%—which is very similar to the measured value of 35%. Thus, no synergy effects between the support layer and the flow layer can be seen. For Example 1, on the other hand, a sound absorption coefficient of (11% [support layer]+23% [flow layer]=34%) is obtained mathematically. However, a value of 45% was measured, which is 11 percentage points above the calculated value and is presumably attributable to the above-described synergistic effects between the flow layer and the support layer and the particular scaffold structure thereof.

Figure 4:
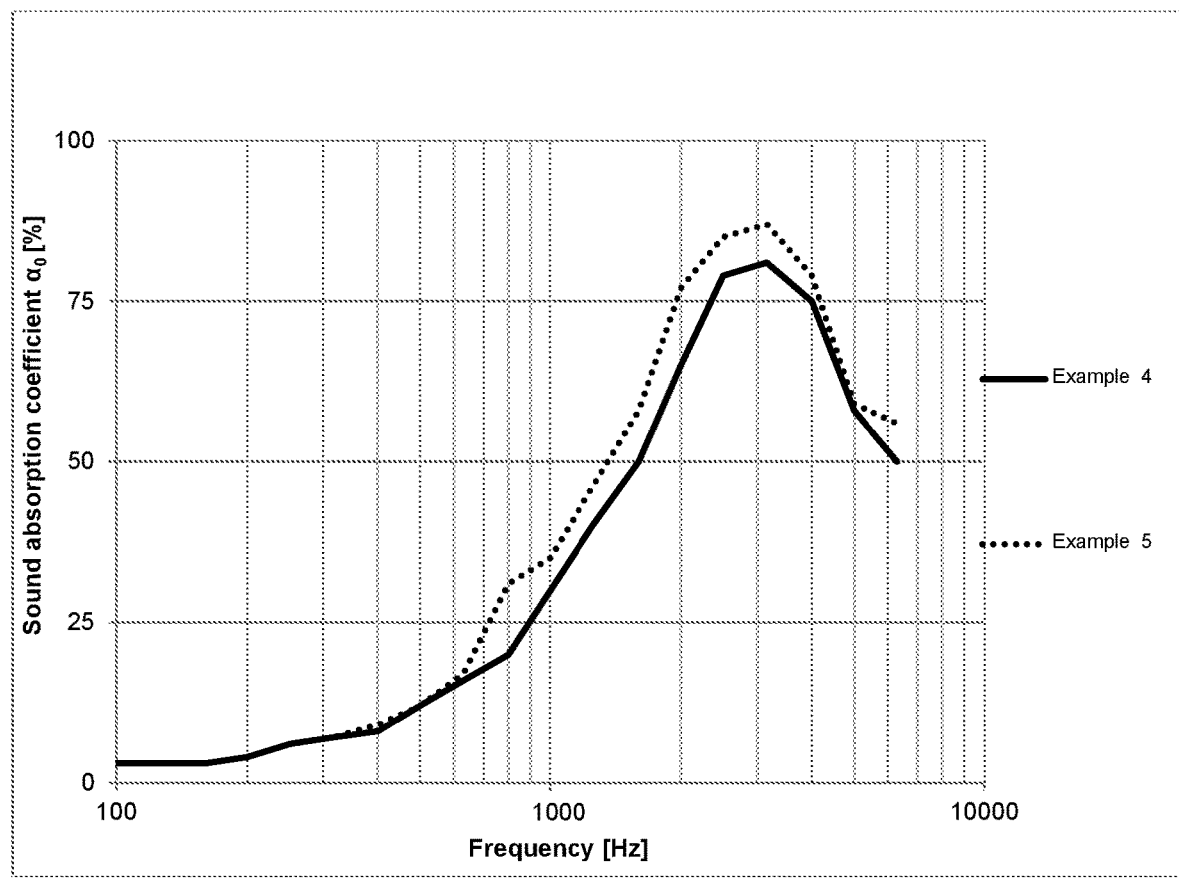
FIG. 4: Comparison of the sound absorption coefficient in the impedance tube (DIN EN ISO 10534) of Example 4 with Example 5.

FIG. 4 shows a comparison of the sound absorption coefficient in the impedance tube (DIN EN ISO 10534) of Example 4 with Example 5. It is apparent that Example 4 (fine fiber content of 80 wt. %) has a higher sound absorption coefficient at 1000 Hz than Example 5 (fine fiber content of 50 wt. %).

The following measurement methods were used to determine parameters used according to the invention:

Test Method for Nonwovens for Determining the Weight Per Unit Area

In accordance with ISO 9073-1, wherein the surface area of the test sample is 100 mm×100 mm.

Test Method for Nonwovens for Determining the Thickness

In accordance with DIN EN ISO 9073-2, methods B and C.

Determination of the Fiber Titer

In accordance with DIN 53810 (Fineness of staple fibers—terms and measuring principles) using a microscope and corresponding software to calculate the fiber diameter. 4 micropreparations of a total of >20 individual fibers are to be prepared. For each micropreparation, fibers are shortened to a length of approximately 2-3 mm using scissors and applied to a specimen holder by means of a dissecting needle. The fiber diameters in μm are then calculated and averaged with the aid of the appropriate software. The averaged fiber diameter can then be converted into the fiber titer Tt using the following formula:

$$Tt\ [dtex] = \frac{\pi * d^2 * \rho}{400}$$

d fiber diameter in μm
$\rho$ density of the fiber in g/cm$^3$

Determination of the Staple Length 10 rovings are selected from a fiber sample, a single fiber being removed from each of the 10 rovings by means of tweezers and the fiber length of the 10 individual fibers being determined by clamping one free end of the fiber into one of the two clamps and clamping the second end of the fiber into the remaining clamp. By turning the handwheel, the fiber is stretched until it is uncurled. The length of the fiber is read off the scale on the measuring device and is noted in mm. The mean of all the recorded results gives the staple length:

$$SP\ [mm] = \frac{\Sigma L}{n}$$

$\Sigma L$ sum of the individual fiber lengths
n number of samples

Determination of the Melting Point

In accordance with DIN EN ISO 11357-3, Differential scanning calorimetry (DSC)—Part 3: Determination of the temperature and enthalpy of melting and crystallization, wherein a heating rate of 10 K/min is used.

Determination of the Compressibility

In accordance with DIN 53885 (Determination of the compression of textiles and textile products), wherein the compressibility is determined by means of a different test device than that described in the standard. A test sample having dimensions of 100 mm×100 mm, a measuring table having a length scale in mm, a metal plate having dimensions of 120 mm×120 mm and a cylindrical weight having a diameter of 55 mm and a mass of one kilogram are provided.

The thickness of the test sample is to be determined prior to the measurement in the unloaded state by means of the measuring table. This value describes the initial thickness $d_0$ in mm. After the initial thickness in the unloaded state has been determined, the metal plate (100 g) is placed on the test sample in the next step and aligned centrally. The cylindrical weight is then placed on the circular marking on the measuring plate, and a load of approximately 1.1 kg is thus applied to the test sample. The absolute compressibility of the test sample is calculated using the following formula and gives the difference between the initial thickness and the thickness in the loaded state:

$$C_a[\text{mm}] = t_0 - t_l$$

$t_0$ initial thickness of the test specimen in mm
$t_l$ final thickness of the test specimen in mm under corresponding loading The relative compressibility $C_r$ in % is:

$$C_r\ [\%] = \frac{C_a}{t_0} * 100$$

Determination of the Resilience

In accordance with DIN EN ISO 1856 (Flexible polymeric foams—determination of compression set). The same setup as already described in the section "Determination of the compressibility" is used as the measuring apparatus. When determining the resilience, the difference between the initial thickness and the final thickness of a material after compressive deformation for a specific time, at a specific temperature and with a given recovery time is determined.

The thickness of the test sample is to be determined prior to the measurement in the unloaded state by means of the measuring table. This value describes the initial thickness $d_0$ in mm. After the initial thickness in the unloaded state has been determined, the metal plate (100 g) is placed on the test sample in the next step and aligned centrally. The cylindrical weight is then placed on the circular marking on the measuring plate, and a load of approximately 1.1 kg is thus applied to the test sample over a period of 24 hours and at room temperature (23° C.+/−2° C.). After 24 hours' loading, the weight and the metal plate are removed from the test sample and the thickness of the test sample is measured again after a recovery time of 30 minutes, and the compression set is determined as follows:

$$CS\ [\%] = \frac{t_0 - t_r}{t_0} * 100$$

$t_0$ initial thickness of the test specimen in mm
$t_r$ the thickness of the test specimen after recovery The resilience of a material can be calculated from the compression set using the following formula:

$$R[\%] = 100 - CS$$

Determination of the Air:Fiber Volume Ratio

The air-to-fiber volume ratio indicates how porous a material is. It can thus be assumed that, where there is a high proportion of air in comparison with fibers, the material has high porosity. The volume ratio $V_{air}$ to $V_{fiber}$ can be calculated as follows. For this purpose, the volume of the test specimen is first calculated using the following formula:

$$V_{test\ specimen}[\text{cm}^3] = l * w * t$$

l length of the test specimen in mm
w width of the test specimen in mm
t thickness of the test specimen in mm, measured in accordance with DIN EN ISO 9073-2, methods B and C After the volume of the test specimen has been determined, the volume of the fibers contained in the nonwoven is calculated in the next step using the following formula:

$$V_{fiber}\ [\text{cm}^3] = \frac{m_{fiber}}{\rho_{fiber\ polymer}}$$

$m_{fiber}$ fiber mass of the test specimen in g
$\rho_{fiber\ polymer}$ density of the fiber polymer in g/cm³

Wherein staple fibers of the polymer polyethylene terephthalate are preferably used in the support layer and a fiber density of approximately 1.38 g/cm³ can thus be assumed. After the fiber volume has been calculated, the air volume can then be determined in a further step using the following formula:

$$V_{air}[\text{cm}^3] = V_{test\ specimen} - V_{fiber}$$

If the air volume and the fiber volume of the test specimen have been determined, these two volume values can then be placed in a ratio with one another.

Test Method for Determining the Flow Resistance

In accordance with DIN EN 29053, Method A (direct airflow method), wherein the effective sample diameter is 100 mm and the air pressure corresponds to 1000 mbar.

Test Method for Determining the Sound Absorption Coefficient and Impedance in the Impedance Tube In accordance with DIN EN ISO 10534-1, Part 1: Method using standing wave ratio (ISO 10534-1:2001-10), wherein tube length A corresponds to 100 cm and tube cross section A corresponds to 77 cm², and tube length B corresponds to 30 cm and tube cross section B corresponds to 6.6 m². The test specimens of the textile composite and of the support layers are applied directly to the reverberant wall and measured. The flow layer is measured at a distance of 20 mm from the reverberant wall.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A sound-absorbing textile composite, comprising:
   a) at least one open-pore support layer comprising coarse staple fibers having a titer of from 3 dtex to 17 dtex and fine staple fibers having a titer of from 0.3 dtex to 2.9 dtex, as scaffold fibers; and
   b) a microporous flow layer arranged on the support layer and comprising microfibers having a fiber diameter of less than 10 µm,
   wherein a flow resistance of the sound-absorbing textile composite is from 250 Ns/m³ to 5000 Ns/m³, and
   wherein the support layer has an air-to-fiber volume ratio of from 75:1 to 250:1.

2. The sound-absorbing textile composite according to claim 1, wherein the sound-absorbing textile composite has a compressibility of from 70% to 100% and/or a resilience of from 70% to 100%.

3. The sound-absorbing textile composite according to claim 1, wherein the support layer comprises a nonwoven.

4. The sound-absorbing textile composite according to claim 1, wherein the support layer comprises at least partially fused binding fibers as further fibers.

5. The sound-absorbing textile composite according to claim 1, wherein the support layer does not contain binding fibers and the support layer contains the coarse staple fibers in a proportion of from 50 wt. % to 90 wt. % based on a total weight of the support layer, or wherein the support layer contains binding fibers as further fibers and a proportion of coarse staple fibers is from 40 wt. % to 80 wt. % based on the total weight of the support layer.

6. The sound-absorbing textile composite according to claim 1, wherein the support layer does not contain binding fibers and the support layer contains the fine staple fibers in a proportion of from 10 wt. % to 50 wt. % based on a total weight of the support layer, or wherein the support layer contains binding fibers as further fibers and a proportion of fine staple fibers is from 10 wt. % to 50 wt. % based on the total weight of the support layer.

7. The sound-absorbing textile composite according claim 1, wherein the fine and coarse staple fibers used as scaffold fibers have, independently of one another, a staple length of from 20 mm to 80 mm.

8. The sound-absorbing textile composite according to claim 1, wherein the support layer is bound by a binder, and wherein the binder comprises polyacrylates, polystyrenes, polyvinyl acetate-ethylene, polyurethanes and mixtures and copolymers thereof.

9. The sound-absorbing textile composite according to claim 1, wherein the flow layer comprises microfibers having a titer of less than 10 µm, and wherein the microfibers comprises meltblown fibers.

10. The sound-absorbing textile composite according to claim 1, wherein the sound-absorbing textile composite has a sound absorption coefficient of from 30% to 100% at 1000 Hz.

11. The sound-absorbing textile composite according to claim 1, wherein the sound-absorbing textile composite has weight per unit area of from 50 g/m² to 350 g/m².

12. The sound-absorbing textile composite according to claim 1, wherein the sound-absorbing textile composite has a thickness of from 5 mm to 35 mm.

13. A vehicle comprising a panel in which the sound-absorbing textile composite according to claim 1 is arranged.

14. The sound-absorbing textile composite according to claim 1, wherein the fine staple fibers have a titer of from 0.5 dtex to 2.9 dtex.

15. The sound-absorbing textile composite according to claim 1, wherein the flow resistance of the sound-absorbing textile composite is from 250 Ns/m³ to 2000 Ns/m3.

16. The sound-absorbing textile composite according to claim 2, wherein the sound-absorbing textile composite has a compressibility of from 75% to 100%.

17. The sound-absorbing textile composite according to claim 16, wherein the sound-absorbing textile composite has a compressibility of from 80% to 100%.

18. The sound-absorbing textile composite according to claim 2, wherein the sound-absorbing textile composite has a resilience of from 75% to 100%.

19. A method for producing a textile composite having a flow resistance of from 250 Ns/m³ to 5000 Ns/m³, the method comprising:
   a) providing at least one open-pore support layer comprising coarse staple fibers having a titer of from 3 dtex to 17 dtex and fine staple fibers having a titer of from 0.3 dtex to 2.9 dtex as scaffold fibers, wherein the support layer has an air-to-fiber volume ratio of from 75:1 to 250:1;
   b) providing a microporous flow layer comprising microfibers having a fiber diameter of less than 10 µm;
   c) arranging the flow layer on the support layer;
   d) connecting the support layer and the flow layer.

* * * * *